Patented May 6, 1930

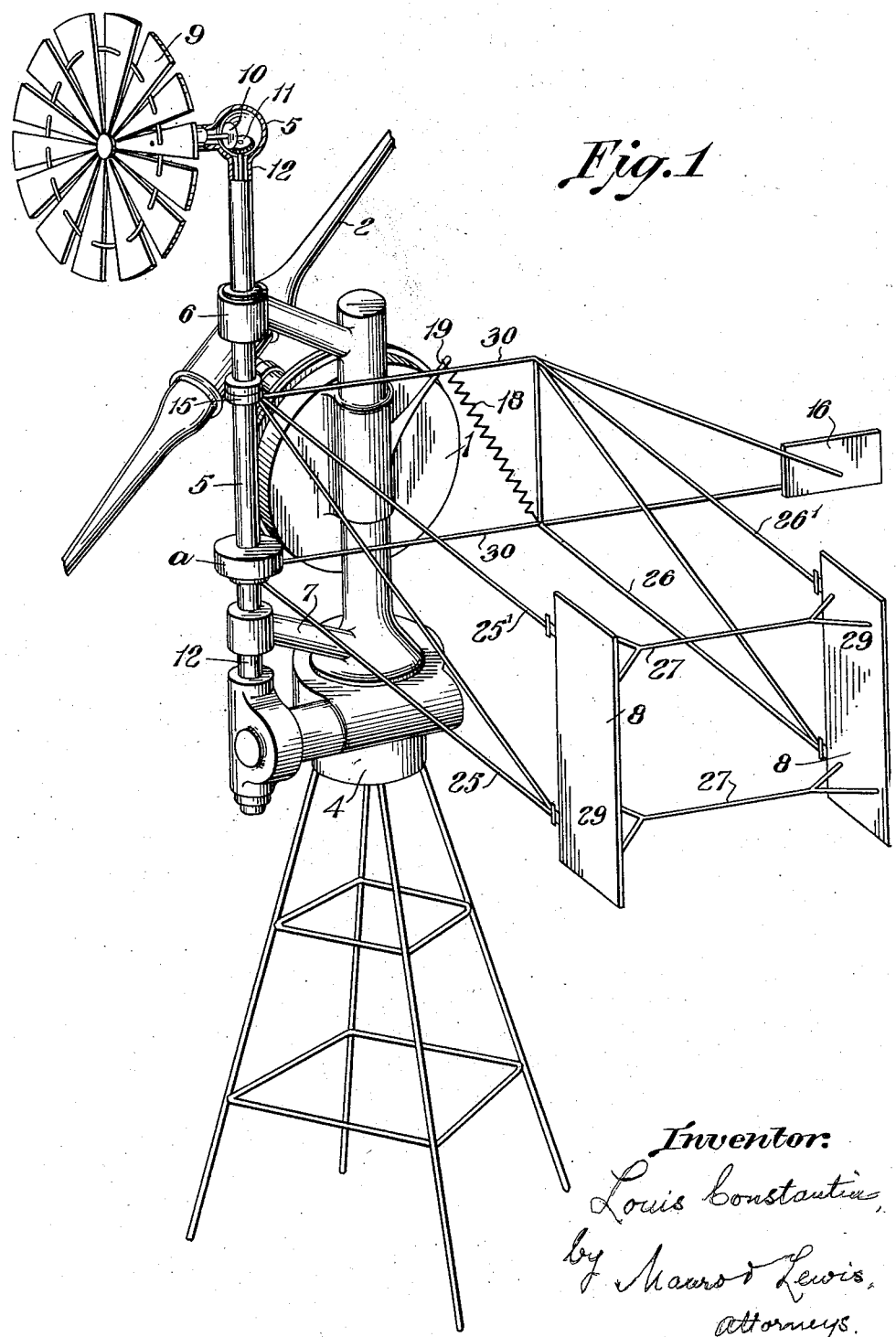

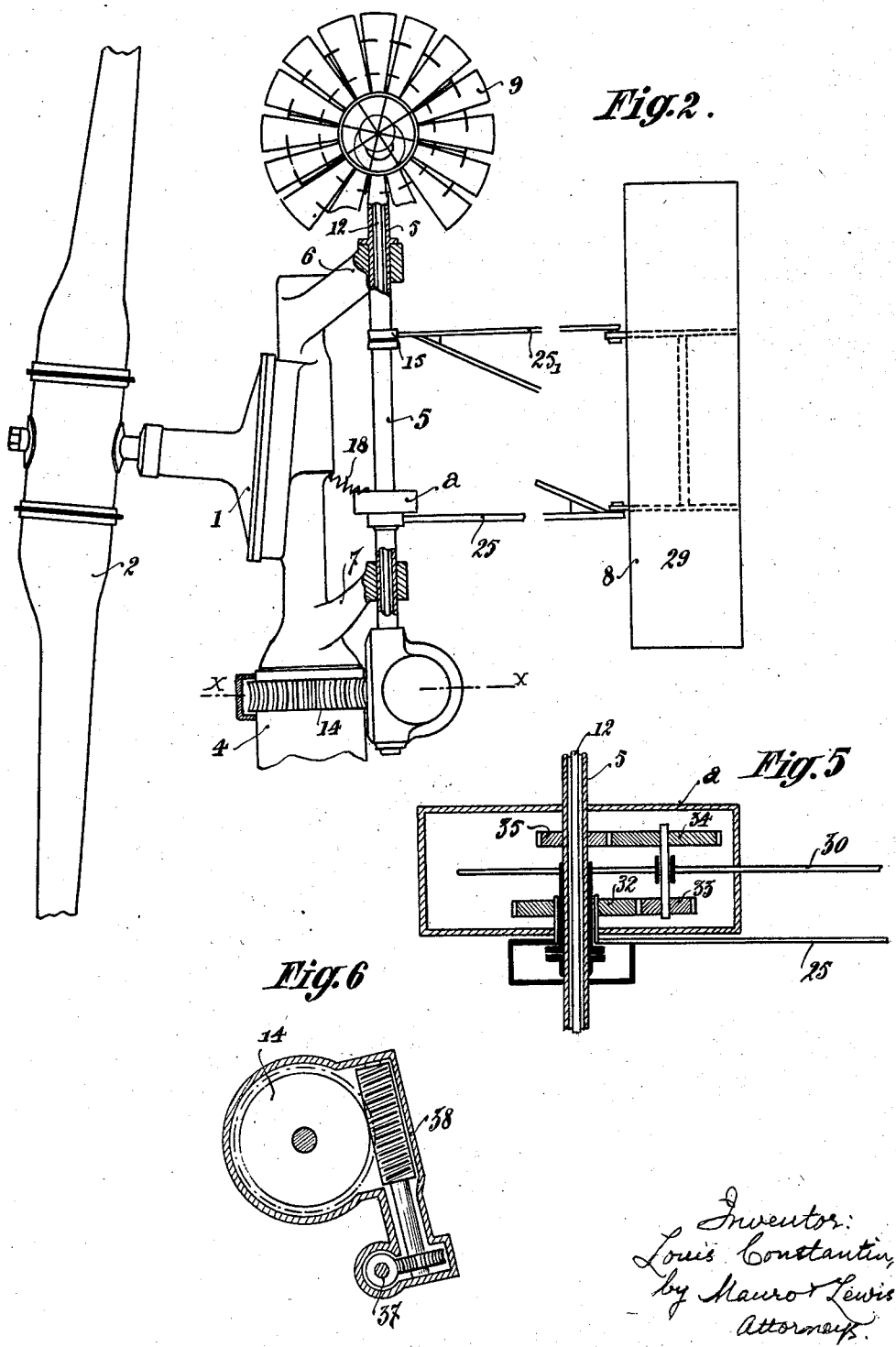

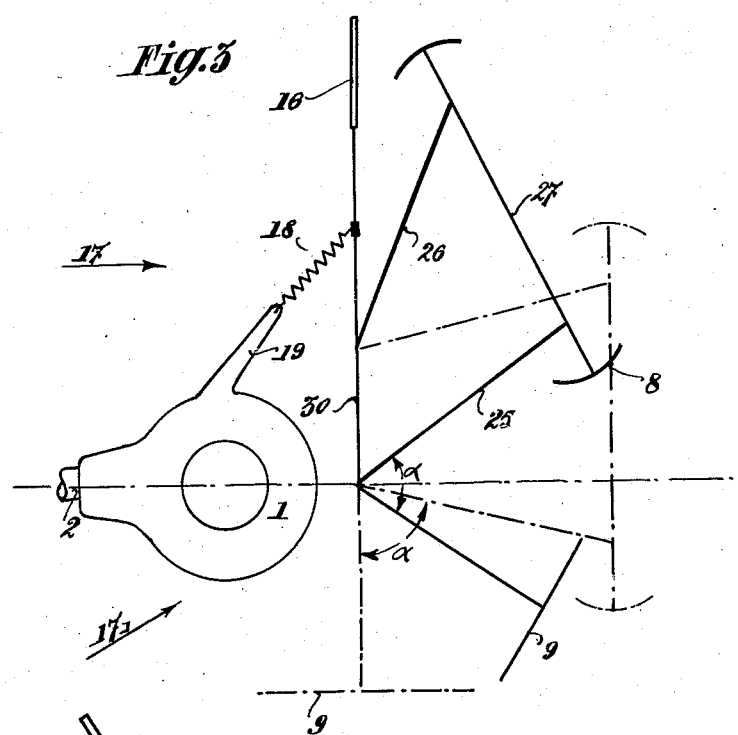
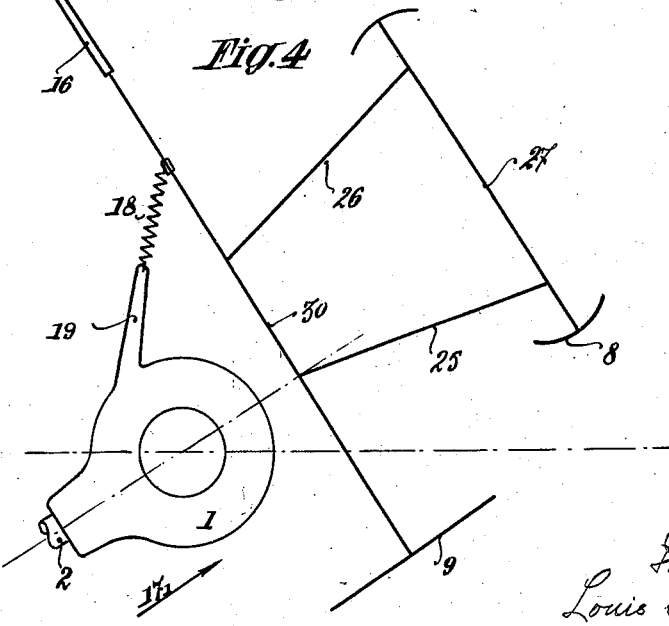

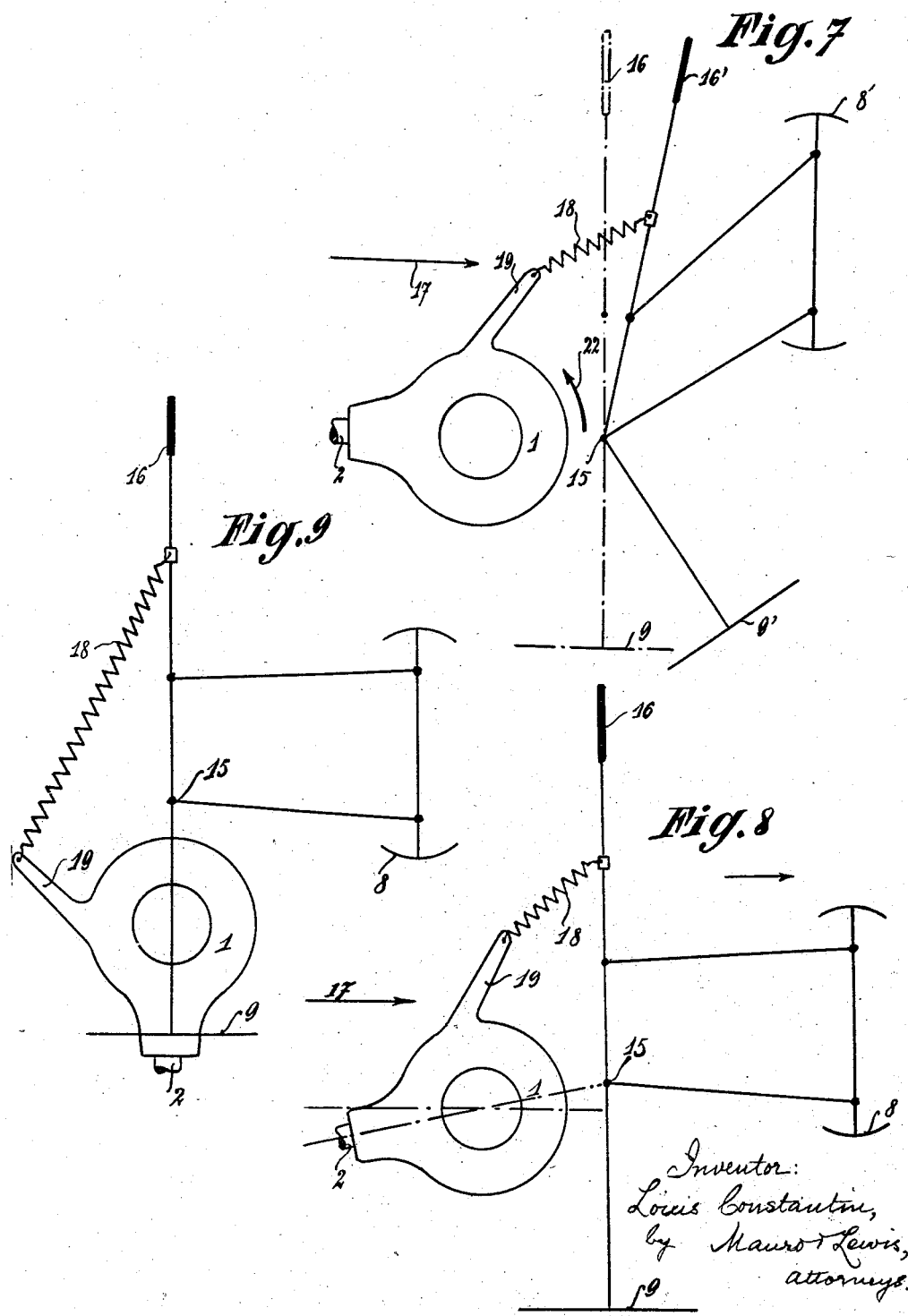

1,757,039

UNITED STATES PATENT OFFICE

LOUIS CONSTANTIN, OF PARIS, FRANCE, ASSIGNOR OF ONE-HALF TO PAUL FORTIER-BEAULIEU, OF ROANNE, LOIRE, FRANCE

CONTROL MECHANISM FOR AIR TURBINES

Application filed December 16, 1927, Serial No. 240,500, and in France December 16, 1926.

The present invention has for its object to provide an apparatus by which windmill wheels and air turbines may be placed out of action during high winds. The said apparatus has a great power and operates in a reliable manner; it is of light weight and small size.

For this purpose I employ a double servomotor, comprising firstly a small auxiliary wind wheel or turbine which supplies the power necessary to place the main wheel out of action, and secondly a wind vane device of a known type such that the said auxiliary wheel will be thereby automatically turned in a direction in which it will furnish a relatively great amount of power.

Finally the invention comprises the disposition, between the arm of the wind vane device and the movable casing of the auxiliary windmill wheel, of a change speed box allowing to multiply by a certain coefficient the displacement of the windmill wheel's casing, under the action of the wind-vane device.

Fig. 1 is a perspective view of an air turbine provided with the device for orientating and putting the same out of action according to the present invention.

Fig. 2 is a side elevation with part sections.

Figs. 3 and 4 are diagrammatic views adapted to explain the operation of the orientating device.

Fig. 5 shows diagrammatically in vertical section and on a large scale the part $a$ or change speed box of Figs. 1 and 2.

Fig. 6 is a section according to line X—X of Fig. 2.

Figs. 7, 8 and 9 are diagrammatic views showing the operation of the device for putting the turbine out of action.

The casing 1 which contains the mechanism of the main turbine 2 is rotatable with respect to a stationary pedestal 4 (Fig. 2) supporting the whole device, and carries a secondary casing 5 by means of brackets 6 and 7 allowing the said casing 5 to rotate with reference to the main casing 1 when it is actuated by the wind vane device 8 of the Constantin type in the conditions which will be hereinafter specified.

The secondary casing 5 carries on its turn the shaft of the auxiliary windmill wheel or air turbine 9 keyed to a first bevel gear wheel 10 which, through the medium of the second bevel gear wheel 11, the worm 37, and the worm wheel 39, imparts its motion to the worm 38 (Figs. 1 and 6) gearing with the toothed ring 14 connected to the stationary support 4. The air turbine 9 whose blades are flat and inclined at 45° with reference to its axis of rotation, revolves in the one or the other direction according as to whether it is struck by the wind from the front to the rear or from the rear to the front. Thus it is obvious that every time the auxiliary air turbine 9 revolves under the action of the wind, the whole device (main casing 1, turbine 2, auxiliary casing 5 and auxiliary windmill wheel 9) will rotate on the vertical axis 3.

The wind vane device of the Constantin type comprises, as it is well known, two surfaces having a curved outline which are symmetrically disposed with reference to their middle plane and mounted upon one of the parallel sides of a double trapezoid articulated at its four apexes and formed by the arms 25, 26, 25¹, 26¹, 27 and 30.

The arm 30 of this trapezoid which is opposite the one on which the surfaces are mounted, carries on its extension a plate 16 for placing the turbine out of action and a spring 18 elastically connecting the arm 30 to the main casing 1 through the medium of a rigid arm 19, this spring being so calculated that when the wind normally strikes the plate 16, this arm will begin to extend but when the wind has exceeded a certain intensity at which the placing out of action of the main turbine 2 is to take place.

The arm 25¹ and the upper arm 30 are connected with a collar 15 loosely mounted on the auxiliary casing 5 and, as shown by Figs. 1 and 2 and on a large scale in Fig. 7, a change speed box $a$ is arranged between the arm 25 of the wind vane device 8 which orientates the windmill wheel 9 and the casing or support 5 of the said wheel, this change speed box transmitting at a given ratio the revolution of the arm 25 of the wind vane device 8 to the casing 5 of the auxiliary windmill wheel 9.

In order to understand the operation of the device forming the object of the invention, the same being considered an orientating device, let us first suppose that the change speed box $a$ has been removed, as in Figs. 3 and 4, and that the arm 25 is rigidly connected to the casing 5, so that the pivotal motion of the arm according to a certain angle will determine a pivotal motion of the casing 5 according to the same angle.

The wind vane device of the Constantin type as specified in my U. S. patent application S. No. 512,367, filed November 2, 1921, has the property that, in its equilibrium position the arm 27 will always be perpendicular to the wind. Consequently, if the turbine 2 is orientated, that is to say if the wind is perpendicular to the middle plane of the blades, the arms 25 and 26 will occupy with reference to the main casing 1 the relative position which is shown in dash and dotted lines in Fig. 3.

The operation of the orientating device which has just been described is then as follows (Figs. 3 and 4). Let us suppose that the wind which first came in the direction of the arrow 17 for which the turbine was orientated now comes in the direction of the arrow $17^1$, the supporting trapezoid of the wind vane device 8 will be distorted so that the arm 27 of said wind vane device will be perpendicular to the direction $17^1$ and will have the position which is shown in full lines in Fig. 3. But, as the secondary casing 5 of the windmill wheel 9 is connected to the arm 25, that is to say as the angle $\alpha$ indicated in Fig. 3 is constant, the windmill wheel 9 which first occupied the position shown in dash and dotted lines will assume under the action of the wind vane device the position shown in full lines. In this new position, as the windmill wheel is not in the direction of the wind, the same will begin to revolve and will in virtue of its rotation displace the main casing 1 and consequently the turbine 2 in the direction of the arrow $17^2$. The windmill wheel will thus revolve until the moment when the turbine 2 will be perpendicular to the new direction of the wind $17^1$, (Fig. 4); at this moment, in fact, the said turbine 2 being orientated and having assumed the position shown in Fig. 4, it is quite obvious that the wind vane device 8 will take with reference to the movable head 1 its initial position of equilibrium corresponding to the first position shown in dash and dotted lines in Fig. 3. The windmill wheel 9 will then be parallel to the direction of the wind $17^1$ and this state of things will be maintained until a new change in the direction of the wind takes place.

However, it may happen that the wind, after ceasing to blow for a certain time, will again commence to blow, but now proceeding from a direction at about 90 degrees from the preceding direction according to which the air wheel was placed, and since the arms 25—26 of the wind vane device 8 cannot in practice take an inclination which exceeds a given value, the air wheel 9 will no longer be situated in the proper direction, and will not receive the wind upon the proper face to be acted upon, so that the said wheel will turn in the contrary direction from what is necessary to properly dispose the main air turbine 2. This rotation of the main turbine in the contrary direction to what is required will take place until a given position is attained, and it will be then reversed in virtue of the sudden turning of the vane device 8, into the contrary position, so that the wheel 9 will continue to turn alternately in one direction and the other, without taking its correct and balanced position according to the direction of the wind at any time.

To obviate this defect, I dispose in the apparatus shown in Figs. 1, 2 and 5, and between the arm 25 of the wind vane 8 which turns the wheel 9 and the support 5 of said wheel, a change-speed box $a$ which imparts at a given increased speed the rotation of the arm 25 of the vane device 8 to the wheel 9, so that even when the vane device 8 is placed in its position of maximum deflection, the wheel 9 will always offer the proper face to the wind which is necessary to cause the rotation of the wheel base 1 in the proper direction.

As shown in Fig. 2 when the main turbine 2 is suitably placed, the wheel 9 is now situated in a plane parallel with the direction of the wind, and the vane device 8 is so arranged that the arms 25—26 will be symmetrical with reference to the middle plane of the said vane device. When the direction of the wind changes by a certain angle, the vane device will move in such manner that the bars 27 connecting the flat members 29 of the said wind vane device will always be perpendicular to the direction of the wind; hence the said arms, chiefly the arm 25, will be subject to a deflection exceeding the angle by which the wind has changed, according to the principle of the Constantin wind vane device. The arm 25 (Fig. 1) is secured to the gear wheel 32 coacting with a gear wheel 33 mounted on a shaft secured to one of the arms 30 of the frame of the said wind vane device; upon the said shaft is mounted the gear wheel 34 coacting with a like wheel 35 keyed to the hollow shaft 5 of the said auxiliary wind wheel; said hollow shaft contains the secondary shaft 12 which imparts the rotation of the wind wheel 9 to the windmill head 1 through the medium of a worm 39, a coacting worm wheel, a second worm 38 and a toothed ring 14 secured to the top of the tower or like support of the windmill wheel. Hence, for a rotation of the arm 25 through an angle $\omega$, the hollow shaft 5 will turn through an angle which is a multiple of ω, this being 3 ω in the apparatus shown in Figs. 7 and 8, and in this manner, even if the vane device 8 is situated in its position of maximum deflection, the wheel 9 will always be so placed with reference to the wind that it will offer to the wind the proper face by which the windmill head I will be caused to rotate in the direction in which the wheel is placed against the wind.

The operation of the device for placing the turbine out of action and shown in the diagrams of Figs. 7, 8 and 9 takes place as follows:

Let us suppose that the wind in the direction 17 becomes strong enough to stretch the spring 18, as shown in Fig. 7, and to bring the blade 16 to the position 16′.

The wind vane device of the Constantin type has the property of placing itself constantly in a position such that its two surfaces—will always be parallel with the direction of the wind, i. e. so that the rigid rod connecting the two surfaces—will be perpendicular to the direction of the wind, so that the said device will assume the position 8′, and the auxiliary air wheel 9 connected therewith will assume the position 9′. When acted upon by the air current at an angle which in Fig. 7 is about 45 degrees, the said air wheel 9 through the medium of the gear shown in Fig. 1—will cause the whole of the movable part to rotate about the axis 3 in the direction of the arrow 22. The rod carrying the said plate and the Constantin device will thus be perpendicular to the direction 17 of the wind; the said device will resume its middle position, the auxiliary wheel will no longer furnish power, and the whole apparatus will thus assume the position of equilibrium, as shown in Fig. 8. At this time the spring 18 will be stretched to a greater degree than is shown in Fig. 3, and the main turbine wheel will be caused to disappear to a slight extent.

If the wind pressure further increases, the wheel will still further disappear, due to a sequence of operations analogous to the one mentioned, and if the force of the wind becomes sufficient to completely stretch the spring 18, which is so disposed that it will be situated at the end of its stroke at the proper moment, the whole apparatus will assume the position of equilibrium as shown in Fig. 9, and herein the main turbine wheel and also the small auxiliary air wheel, will be made to disappear entirely.

Obviously, the constructions herein described are given solely by way of example, and are susceptible of various modifications without departing from the spirit of the invention.

For example, the said change-speed box may be mounted and arranged in a different manner from what has been represented.

The Constantin wind vane device may if absolutely necessary be replaced by an ordinary wind vane with vertical surface. Although the operation is less accurate and reliable, the apparatus can still be employed.

What I claim is:

1. In a device having a main turbine mounted upon a head rotatable with reference to a fixed member and an auxiliary turbine adapted to control the rotation of said movable head and mounted in a casing which is pivoted with reference to said movable head, a collapsible quadrilateral, orientating surfaces on said quadrilateral, means for connecting said quadrilateral with the pivoted casing of the auxiliary turbine and means in combination with said quadrilateral for effecting the disappearing of the main turbine when the speed of the wind considerably increases.

2. In a device having a main turbine mounted upon a head rotatable with reference to a fixed member and an auxiliary turbine adapted to control the rotation of said movable head and mounted in a casing which is pivoted with reference to said movable head, a collapsible quadrilateral, two orientating surfaces on the said quadrilateral, means for connecting said quadrilateral with the casing of said auxiliary turbine, a blade mounted on an extension of one of the bars of said quadrilateral and a spring the ends of which are secured to the movable head of said main turbine and to the said bar.

3. In a device having a main turbine mounted upon a head rotatable with reference to a fixed member and an auxiliary turbine adapted to control the rotation of said movable head and mounted in a casing which is pivoted with reference to said movable head, a collapsible quadrilateral, two orientating surfaces on the said quadrilateral, a change speed box inserted between said quadrilateral and said casing, a blade mounted on an extension of one of the bars of said quadrilateral and a spring the ends of which are secured to the movable head of said main turbine and to the said bar.

4. In a device having a main turbine mounted upon a head rotatable with reference to a fixed member and an auxiliary turbine adapted to control the rotation of said movable head and mounted in a casing which is pivoted with reference to said movable head, a collapsible quadrilateral, two orientating surfaces on the said quadrilateral and said casing and means in combination with said quadrilateral for effecting the disappearing of the main turbine when the speed of the wind considerably increases.

5. In a device having a main turbine mounted upon a head rotatable with reference to a fixed member and an auxiliary turbine adapted to control the rotation of said movable head and mounted in a casing which is pivoted with reference to said movable head, a collapsible quadrilateral, two orientating surfaces on the said quadrilateral, means for connecting said quadrilateral with the casing of said auxiliary turbine, a blade mounted on an extension of one of the bars of said quadrilateral and yieldable means for connecting said blade with the movable head of the main turbine.

6. In a device having a main turbine mounted upon a head rotatable with reference to a fixed member and an auxiliary turbine adapted to control the rotation of said movable head and mounted in a casing which is pivoted with reference to said movable head, a collapsible quadrilateral, orientating surfaces on said quadrilateral, and means for connecting said quadrilateral with said pivoted casing of the auxiliary turbine.

In testimony whereof I have signed this specification.

LOUIS CONSTANTIN.